United States Patent
Yang

Patent Number: 5,311,412
Date of Patent: May 10, 1994

[54] STRUCTURE OF A VARIABLE TRIANGULAR WARNING LIGHT ON THE THIRD BRAKING LIGHT IN THE REAR TURBULENCE PLATE OF AN AUTOMOBILE

[76] Inventor: Chang-An Yang, No. 9, Alley 100, Lane 21, Wei-Hu Road, Nei-Hu, Taipei, Taiwan

[21] Appl. No.: 86,061

[22] Filed: Jul. 6, 1993

[51] Int. Cl.$^5$ ............................ B60Q 1/44; B60Q 1/52
[52] U.S. Cl. .................................. 362/83.3; 362/250; 362/800; 340/472; 340/479; 296/91; 296/180.1
[58] Field of Search .................. 362/61, 80, 83.3, 250, 362/285, 418, 427, 800, 398; 340/472, 479; 296/91, 180.1

[56] References Cited

U.S. PATENT DOCUMENTS

| | | | |
|---|---|---|---|
| 4,736,279 | 4/1986 | Yamai et al. | 362/83.3 |
| 4,819,132 | 4/1989 | Huan et al. | 362/61 |
| 4,825,191 | 4/1989 | Ching-Hwei | 340/472 |
| 5,041,813 | 8/1991 | Chang | 340/472 |
| 5,126,926 | 6/1992 | Wen | 362/83.3 |

*Primary Examiner*—Richard R. Cole
*Attorney, Agent, or Firm*—Bacon & Thomas

[57] ABSTRACT

This invention relates to a structure of a variable triangular warning light for a third braking light in a rear turbulence plate of an automobile, in particular, to an "LED" third braking light which is hidden within the rear turbulence plate, and can be formed into a flashable triangular failure warning light by means of pulling-out, folding and locking means to indicate a failure when the automobile is in failure, characterized in that the rear turbulence plate is provided with a receiving groove, receiving tubular holes and springs, and a three-section typed "LED" third braking light of an elongate strip shape having hinges is a foldable structure; live lock member can be used as disengagement/engagement means for the outward pulling or inward inserting of the three-section typed third braking light. Further, after the third braking light has been pulled out and folded into a triangular shape, both ends of the three-section third braking light can be connected together to form a flashable flashable triangular failure light.

5 Claims, 5 Drawing Sheets

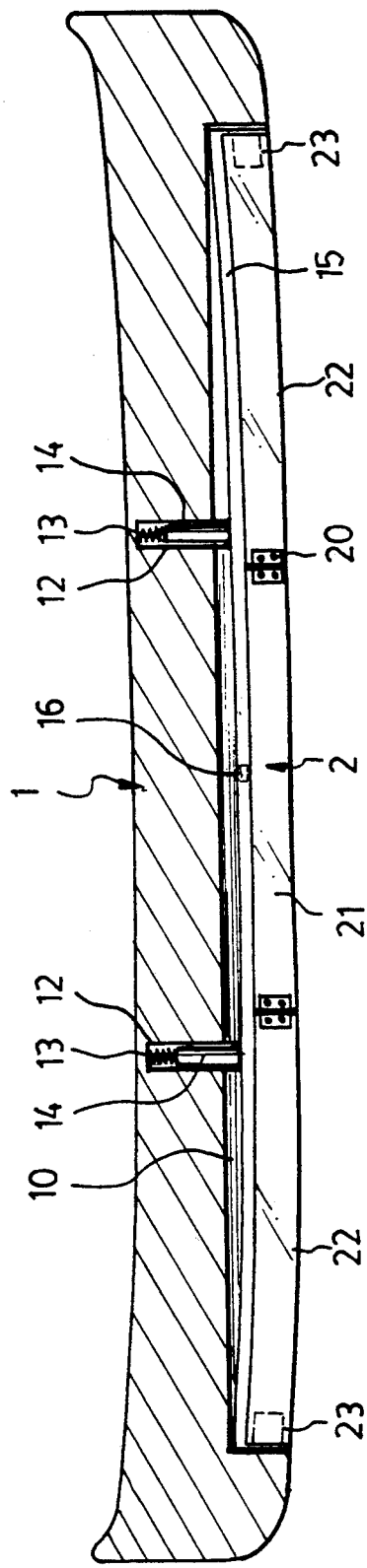
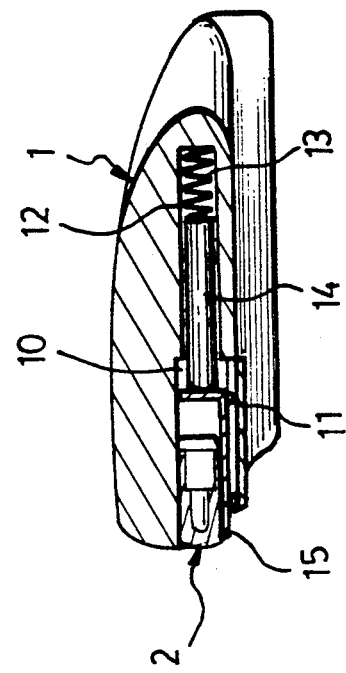
FIG. 3
FIG. 4

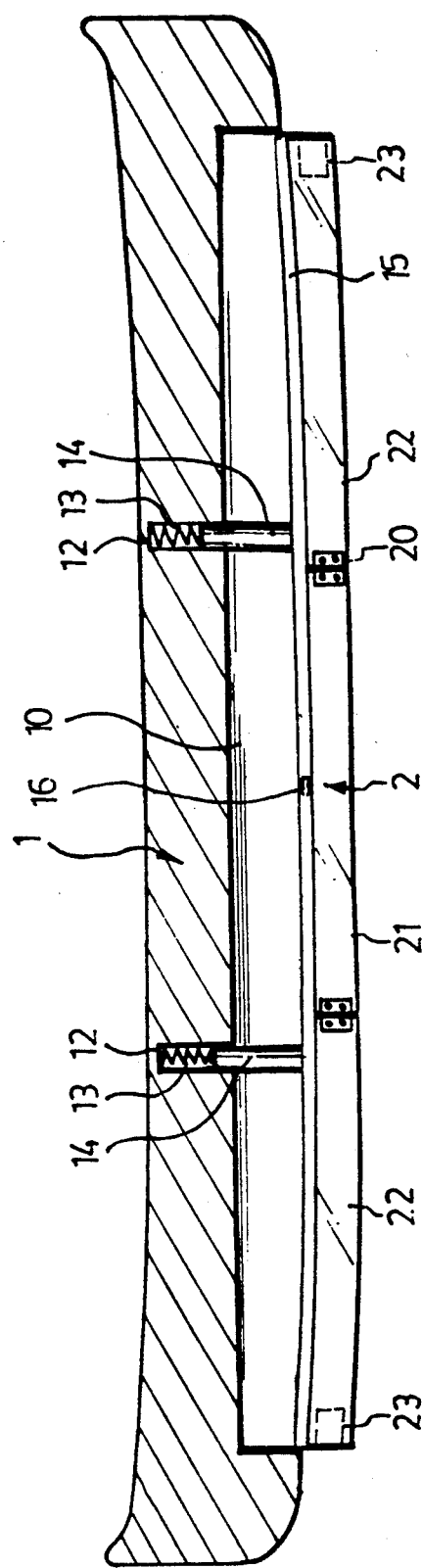
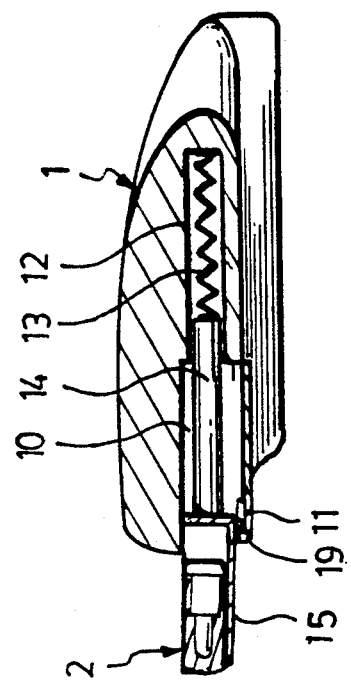
FIG. 5
FIG. 6

STRUCTURE OF A VARIABLE TRIANGULAR WARNING LIGHT ON THE THIRD BRAKING LIGHT IN THE REAR TURBULENCE PLATE OF AN AUTOMOBILE

BACKGROUND OF THE INVENTION

The present invention relates to a variable triangular failure warning light for the third braking light provided in the rear turbulence plate of an automobile, in particular, to an "LED" (light emitted diode) third braking light device which is provided in the rear turbulence plate of an automobile which can be pulled out and folded into a triangular warning light for indicating failure of the vehicle.

Since a third braking light of an automobile can warn the other automobiles behind when braking, and the numbers of automobiles in recent years has increased and all the roads and freeways are crowded, the third braking lights have become a popular device for driving more safely, and also have become standard equipment for most automobile.

Further, a triangular warning sign of reflection type which can be put on the road behind the automobile which has a failure, is usually kept in rear trunk of an automobile. Hence, when an automobile has a failure, the driver must first park the failed automobile in a proper position, and then take the triangular warning sign from the rear trunk of the automobile, and put it on the road behind the automobile at a proper distance to warn the other automobiles behind.

The third braking lights have become necessary equipment for an automobile, while the conventional triangular failure warning signs are not convenient in use and have many disadvantages: for example, A: the sign is not easy to be seen by the drivers of the automobiles behind the failure automobile due to the fact that the triangular failed warning sign is placed low on the ground; B: the warning effect of the conventional triangular failure warning sign is poor since said sign is of a reflection type; C: when using the conventional warning sign, the driver must open the rear trunk and then take out the warning sign and fold it into triangular shape, walk a distance to put it on the ground behind the automobile, and after the use of the sign is ended, the driver must return the warning sign to the rear trunk, which will affect the willingness of the driver to use the conventional triangular sign. Hence, it is necessary to improve the conventional triangular failure sign.

The aforesaid disadvantages can be avoided by this invention. It is found that the conventional triangular failure sign is requested to be put at a distance behind the failed automobile, which is because the triangular warning sign can not be easily seen by the drivers of automobiles far away from the failed automobile; therefore it is necessary to increase the distance between the automobile and the sign, also because of the poor warning effect of the conventional warning sign of reflection type, the distance between the automobile and the sign must be increased and thus the driver must walk back and forth to put and return the warning sign, which is very troublesome and inconvenient. Hence, if height of the warning sign (i.e., being put high above the ground) and the brightness of the sign can be improved, the aforesaid disadvantages can be overcome.

SUMMARY OF THE INVENTION

Hence, the inventor improves the existed "LED" third braking light in the rear turbulence plate of an automobile such that when automobile failure occurs, the third braking light can be converted into a flashing triangular warning light.

It is a main object of the present invention to provide a structure for the third braking light which can be pulled out and folded into a triangular failure warning light to add a new function to the third braking light.

It is another object of the present invention to provide a triangular failure warning light which can automatically light and improve the poor warning effect of the conventional warning sign of reflection type.

It is another object of the present invention to provide a triangular failure warning light which can stand on the rear turbulence plate of an automobile to enhance the visibility of the triangular warning light to warn the automobiles behind.

It is another object of the present invention to provide a self-lighting triangular warning light which can be put on a higher position to prevent the driver of the failure automobile from walking back and forth for a distance to put and to return the conventional failure warning sign.

BRIEF DESCRIPTION OF THE INVENTION

A complete understanding of the invention may be obtained from the following detailed description when read in conjunction with the appended drawings, in which:

FIG. 3 is a top view showing the section of the present invention in hidden condition;

FIG. 4 is a side view showing the section of the present invention in hidden condition;

FIG. 5 is a top view showing the section of the present invention when in use;

FIG. 6 is a side view showing the section of the present invention when in use;

DETAILED DESCRIPTION OF THE DRAWING

Figure 1:
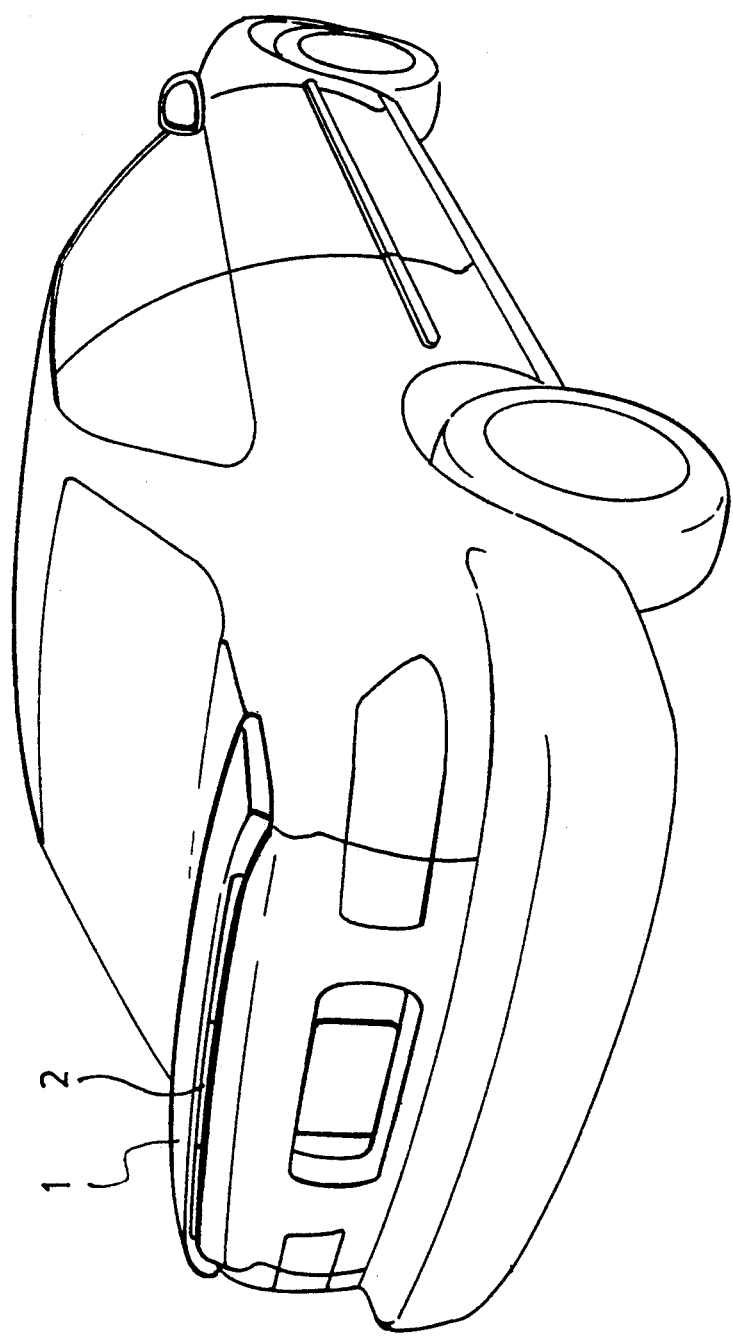
FIG. 1 is a perspective view of an embodiment of the present invention in hidden condition.
Figure 2:
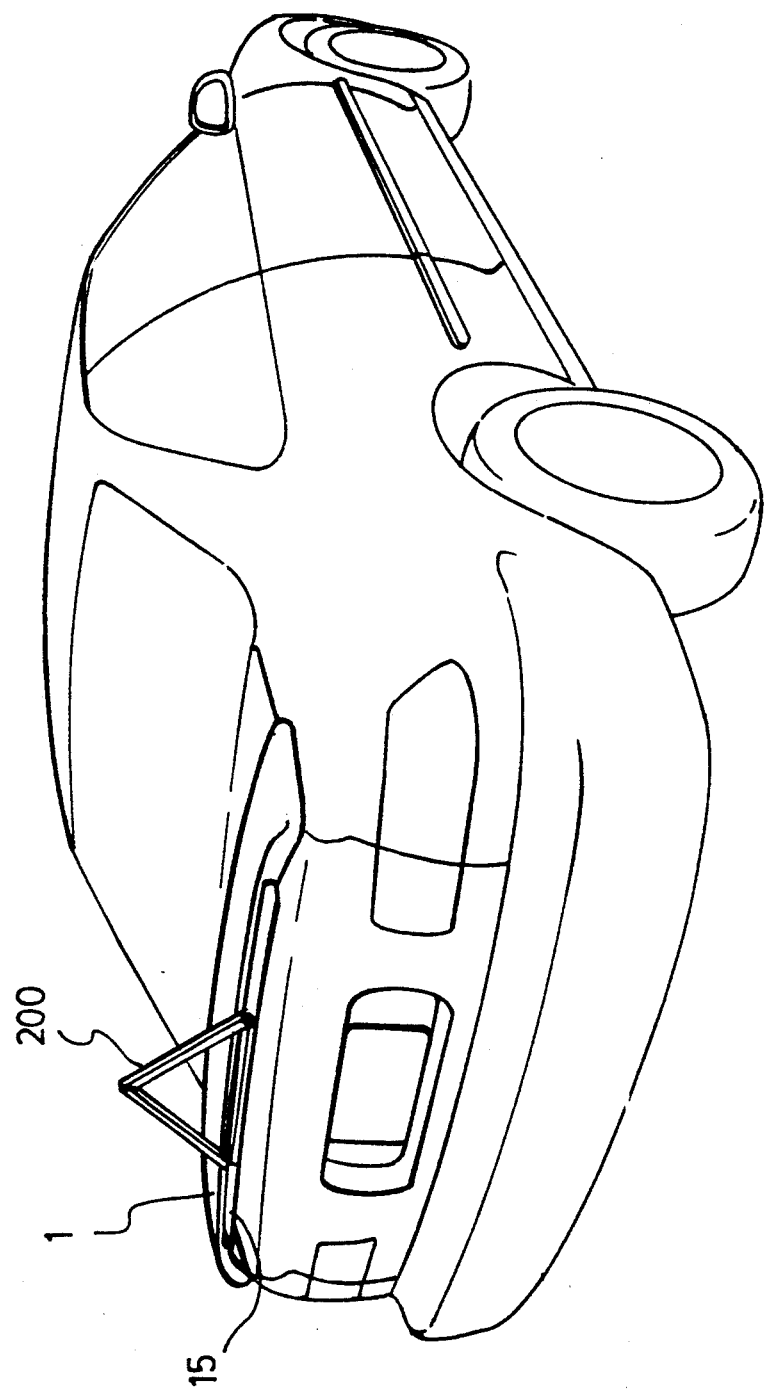
FIG. 2 is a perspective view showing the present invention when in use.

Please refer to FIGS. 1 and 2. As shown in FIG. 1, a three-section type third braking light (2) according to the present invention, hidden on the lower portion of a rear turbulence plate (1), serves as a third braking light in normal conditions; when the automobile is in failure or an accident, and has to be stopped in the middle or the side of the road, the three-section type third braking light (2) can be pushed outward and the left and right sections of the three-section type third braking light (2) can be moved to form an equilateral triangular failure warning light (200) which can cooperate with the automobile accident flash light to effectively and accurately warn the other automobiles behind.

Please refer to FIGS. 3 and 4. The embodiment shown in FIGS. 3 and 4 can accomplish the function mentioned above. The three-section type third braking light (2) according to present invention is hidden on the lower portion of the rear turbulence plate (1), and its exposed flashable front surface and the turbulence plate form an integral configuration. The three-section type third braking light (2) is mounted on a supporting plate (15), and the middle section (21) of the light (2) is connected to the middle portion of the supporting plate while the left and right sections (22) of the light (2) are mounted on the plate (15) by means of the magnetic blocks (23) which are respectively provided on the outer ends of the left and right sections and can attract the plate (15) (the plate (15) is made of steel material). The plate (15) is connected with at least two sliding members (14) of which each is inserted into tubular hole (12) of the rear turbulence plate (1). Within each hole (12), is provided a spring (13) to produce a reverse spring pressure acting on the inserted sliding member (14). A live lock member (16) is provided right under the plate (15); said member (16) will perform engagement and disengagement motions when subjected to more than two pressing motions including forward and backward pressing. A base plate (11) is provided on the bottom of the lower groove (10) of the rear turbulence plate and can be used to restrict the aforesaid members and motions thereof under the condition that the aforesaid members are associated with the rear turbulence plate (1).

Please refer to FIGS. 5 and 6. When an automobile is in failure or an accident and must be stopped in the middle of road or road side, the driver can press the middle section (21) such that plate (15) brings the live lock member (16) to be pressed inwardly, and when driver stops pressing the middle section, the lock member (16) is released; at this time, the spring (13) can produce an effective outward pressure to push the plate (15) with the three-section typed third braking light (2) outward such that the plate (15) is stopped at the engagement edge (19) of the base plate (11). Since the middle section (21) of the light (2) is fixed on the plate (15) while the left and right sections (22) of the light (2) are attracted and mounted on the plate (15) by means of the magnetic blocks (23), the left and right sections can be lifted up by means of hinges (20) such that the two magnetic blocks (23) can be attracted each other to form an equilateral triangular failure warning light (200) which can flash with the automobile accident flash light as shown in FIG. 2.

After the condition of temporary stop of the automobile is ended, one only needs to return the left and right sections (22) of the light (200) to original horizontal position and the magnetic blocks (23) will attract the plate (15) again, and then the driver can push the plate (15) into the lower grove (10) of the rear turbulence plate (1), and the live lock member (16) will return to the lock up position again so as to obtain the original third braking light (2).

Figure 7D:
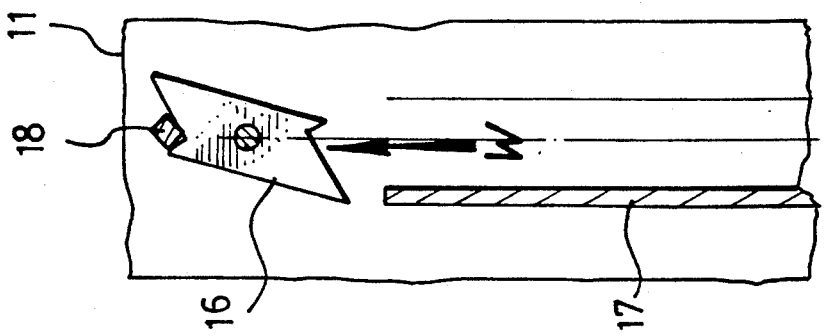
FIGS. 7A-7D are schematic views showing the action of the live lock member of the present invention.
Figure 7C:
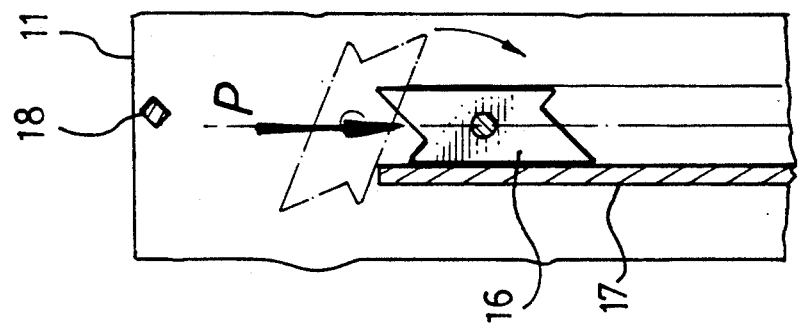
Figure 7B:
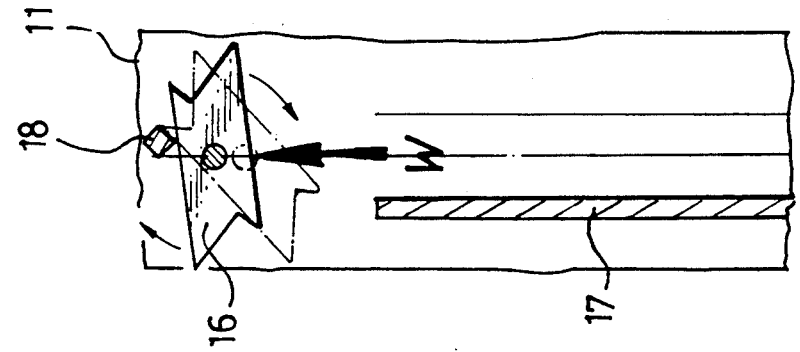
Figure 7A:
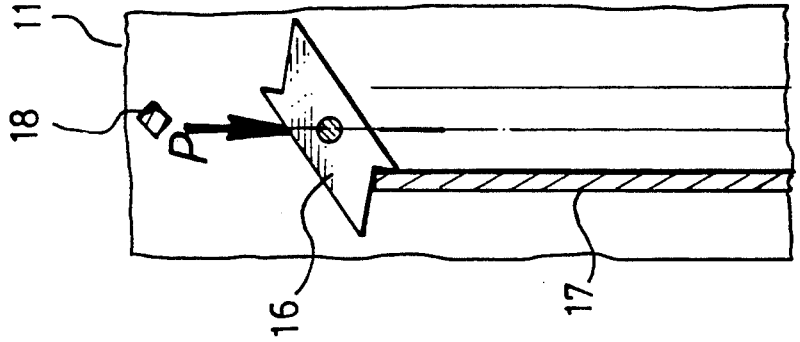

The aforesaid motion of the live lock member (16) can be performed as illustrated in FIGS. 7A-7D. From FIGS. 7A-7D, it can be found that the live lock member (16) pivotedly is mounted under the plate (15) and is a rotatable star shaped block. By means of a guide groove wall (17) on the base plate (11) and a stop projection (18) on the front end of base plate (11), motion of engagement or disengagement of the live lock member can be obtained. As shown in FIG. 7A, the live lock member (16) and the plate (15) are subjected to a pressure (P) of spring (13) such that the lock member (16) is engaged with the guide groove wall (17) of base plate (11). As shown in FIG. 7B, after the plate (15) and the live lock member (16) are subjected to a reverse manual force (W), the live lock member (16) can be rotated and deflected under the function of the stop projection (18).

As shown in FIG. 7C, when the manual force (W) disappears, pressure (P) will push plate (15) with the live lock member (16) outward and the lock member (16) is guided by and slides along the guide groove wall (17) such that the plate (15) can project outwards under the pressure (P). If applying force (W) again, as shown in FIG. 7D, the live lock member (16) will slide along the guide groove wall (17) and will deflect when encountering the stop projection (18). As shown in FIG. 7A, when force (W) disappears again, the live Lock member (16) will return to lock up position.

The shape of the aforesaid live lock member (16) can be a rectangular shape and is provided with two opposite cut-outs of scalene shape respectively at the two ends thereof.

While the present invention has been described above with respect to a preferred embodiment thereof, it should be understood that the present invention should not be limited only to the embodiment but various change or modifications may be made without departure from the scope of the invention as defined by the appended claims.

The present invention which has a firm structure and will not affect the appearance of the automobile, and further, can provide a novel and extraordinary function for a third braking light, and can overcome the disadvantages of a conventional triangular warning sign of reflection type, and is a practical, useful and new invention.

I claim:

1. A structure of a variable triangular warning light for a third braking light in a rear turbulence plate of an automobile, basically utilizing a third braking light which is hidden within the rear turbulence plate, and can be pushed outward and folded into a triangular failure warning light, characterized by:
    a three-section type third braking light of an elongate strip shape, which is partially movable by hinge means and
    is mounted on a lower groove in a lower portion of the rear turbulence plate of the automobile by means of a supporting plate and lock means, when in use, said third braking light can be pushed outward and be folded by means of said hinge means into a triangular failure warning light, wherein a middle section of said three-section type third braking light is fixed on a middle of said supporting plate which can be pulled outward or pushed inward; outer ends of the left and right sections of said three-section type third braking light are respectively provided with magnetic blocks to be able to attract the plate or attract each other; the lock means is provided under said supporting plate to be engaged with or disengaged from a base plate in said lower groove of said rear turbulence plate; said supporting plate is connected with a plurality of sliding members, which can be slid within tubular holes provided in said rear turbulence plate.

2. A structure as claimed in claim 1 wherein said base plate has a plurality of grooves for said reinforcement, which can be used as sliding grooves for lock means.

3. A structure as claimed in claim 1 wherein said three-section type third braking light utilizes a plurality of "LEDs" (light emitting diodes), and can flash when being folded into a triangular failure warning light.

4. A structure as claimed in claim 1 wherein a spring is provided between a bottom of said tubular hole and the sliding members so as to produce a spring pressure on the sliding members and the supporting plate.

5. A structure as claimed in claim 1 wherein said lock means is a live lock member located under the supporting plate, said live lock member being a rotatable member of a rectangular shape having two opposite scalene-shaped cut-outs respectively provided on two ends thereof and cooperating with a stop projection and a guide groove wall provided on said base plate so as to perform the motion of engagement or disengagement when subjected to an external force.

* * * * *